3,117,840
PROCESS FOR THE PREPARATION OF DIBORANE
Nicole Marie Joseph, Paris, France, assignor to Societe des Usines Chimiques Rhone-Poulenc, Paris, France, a French body corporate
No Drawing. Filed July 25, 1958, Ser. No. 750,877
Claims priority, application France Aug. 9, 1957
6 Claims. (Cl. 23—204)

This invention relates to a new process for the production of diborane.

Diborane is a particularly valuable compound both for chemical synthesis and for industry. It constitutes in particular a fuel of particularly high calorific value, so that it may be employed, for example, for the propulsion of aircraft and rockets. In the conventional process of making it use is made of alkali metal hydrides and mixed hydrides, more especially lithium-aluminium hydride; however these compounds have only moderate stability and are consequently dangerous to handle.

It has subsequently been proposed to use alkali metal borohydrides as starting materials, in particular sodium borohydride. The latter substance is easier to handle than alkali metal hydrides or lithium-aluminium hydride, but it has the disadvantage of being hygroscopic and thus having only moderate keeping properties.

Potassium borohydride is not attended by these disadvantages, but it has not been possible to obtain appreciable quantities of diborane by applying to potassium borohydride the method of operation proposed for sodium borohydride.

The present invention provides a process which very regularly gives excellent yields of substantially pure diborane from potassium borohydride. This process is characterised in that a boron halide, preferably boron fluoride or chloride, is reacted with potassium borohydride in a liquid reaction medium which is inert towards diborane and potassium borohydride and in the presence of a substantial qantity of a metal halide.

It is particularly advantageous to employ an ether or a mixture of ethers as the reaction medium. Thus there may be used acyclic monoethers (for example a dialkyl ether such as diethyl ether), polyethers (for example a dialkyl ether of a di- or polyalkylene glycol, e.g. diethylene glycol dimethyl ether) and cyclic ethers (for example tetrahydrofuran or dioxan). The cyclic ethers are however less suitable than the others by reason of their high solvent power for diborane.

The boron halide may be employed directly or in the form of an etherate.

The metal halide used is preferably a halide, especially a chloride, of a metal of electrode potential (in at least one valency form) below 2 volts and especially between 2 volts and zero. The halides, especially the chlorides, of zinc, aluminium and tin are particularly useful.

The reaction should be carried out in the absence of oxygen and moisture, and at about room temperature or a moderately elevated temperature, for example at a temperature, between 15° and 100° C. or the boiling point of the reaction medium, whichever is the lower. While temperatures above or below this range can be used they have no particular advantage. The diborane obtained may be isolated in a substantially pure form by the conventional methods.

The following examples illusrate the practice of the invention without limiting it in any way.

*Example I*

A round-bottomed flask having three necks provided respectively with a ground stirring rod, with a dropping funnel to which is connected on inlet for dry nitrogen and with a condenser filled with a mixture of acetone and carbon dioxide snow, the top of which communicates with a series of traps separated by mercury valves, is carefully dried. The first trap is maintained at −80° C., while the others are submerged in liquid nitrogen.

1.59 g. of pulverised potassium borohydride, 0.93 g. of aluminium chloride and 10 cc. of anhydrous ether are introduced into the flask. The flask is swept by a current of dry nitrogen and 12.6 g. of boron fluoride etherate are introduced drop-by-drop with stirring. The stirring is contiued for 2 hours at room temperature. The diborane formed is carried into the traps by a light current of nitrogen, and is obtained in a yield of 74%.

*Example II*

By proceeding as in Example I, but heating at 60° C. for 3 hours, diborane is obtained in the same yield.

*Example III*

By proceeding as in Example I, but replacing the 10 cc. of ether by 5 cc. of diethylene glycol dimethyl ether, diborane is obtained in a yield of 85%.

*Example IV*

By proceeding as in Example I, but replacing the aluminium chloride by 0.95 g. of zinc chloride, diborane is obtained in a yield of 80%.

*Example V*

By proceeding as in Example I, but replacing the aluminium chloride by stannous chloride, diborane is obtained in a yield of 55%.

*Example VI*

1.63 g. of pulverised potassium borohydride, 1.33 g. of pulverised aluminium chloride, and 10 cc. of dry ether are placed in the flask described in Example I, a current of dry nitrogen is passed through, and 10 cc. of liquid boron trichloride is added little by little while stirring. An energetic reaction takes place. Stirring is continued for two hours at room temperature. The diborane formed is carried into the traps by a light current of nitrogen, and is obtained in a yield of 76.8%.

I claim:
1. Process for the production of diborane, which comprises bringing boron fluoride into reaction with potassium borohydride in a liquid ether as a reaction medium which is inert towards diborane and potassium borohydride and in the presence of a substantial quantity of a halide of a metal selected from the group which consists of zinc, aluminium and tin.
2. Process for the production of diborane, which comprises bringing boron fluoride into reaction with potassium borohydride in an acyclic liquid ether which is inert towards diborane and potassium borohydride as reaction medium and in the presence of a substantial quantity of a halide of a metal selected from the group which consists of zinc, aluminium and tin.
3. Process for the production of diborane, which comprises bringing a boron trifluoride into reaction with potassium borohydride in an organic liquid reaction medium consisting of a liquid ether which is inert towards diborane and potassium borohydride under the reaction conditions and in which the ether group is the sole functional group, the reaction being carried out in the presence of a substantial quantity of a halide of a metal selected from the group which consists of zinc, aluminium and tin.
4. Process for the production of diborane, which comprises bringing a boron halide into reaction with potassium borohydride in a liquid ether as a reaction medium which is inert towards diborane and potassium borohy- dride and in the presence of a substantial quantity of zinc chloride.

5. Process for the production of diborane, which comprises bringing a boron halide into reaction with potassium borohydride in an organic liquid reaction medium consisting of a liquid ether which is inert towards diborane and potassium borohydride under the reaction conditions and in which the ether group is the sole functional group, the reaction being carried out in the presence of a substantial quantity of zinc chloride.

6. Process according to claim 5 wherein the organic liquid reaction medium is selected from the group consisting of diethyl ether, di-n-butyl ether and diethyleneglycoldimethylether.

References Cited in the file of this patent

UNITED STATES PATENTS

| | | |
|---|---|---|
| 2,543,511 | Schlesinger et al. | Feb. 27, 1951 |
| 2,796,328 | Jackson et al. | June 18, 1957 |
| 2,856,428 | Brown | Oct. 14, 1958 |
| 2,867,499 | Good et al. | Jan. 6, 1959 |
| 2,888,327 | Adams | May 26, 1959 |
| 2,994,586 | Huff | Aug. 1, 1961 |

OTHER REFERENCES

Kirk-Othmer: "Encyclopaedia of Chemical Technology," 1st supplement, vol. 1957, page 109.

Schechter et al.: "Boran Hydrides and Related Compounds, prepared under Contract NO. 2(s) 10992 for Dept. of Navy, Bureau of Aeronautics, prepared by Callery Chemical Co., printed March 1951, declassified December 1953, page 20.